United States Patent
Murakami et al.

(10) Patent No.: US 10,778,068 B2
(45) Date of Patent: Sep. 15, 2020

(54) ROTATING ELECTRICAL MACHINE COOLING STRUCTURE, AND CONTROL METHOD THEREOF

(71) Applicant: Mitsubishi Electric Corporation, Tokyo (JP)

(72) Inventors: Tadashi Murakami, Tokyo (JP); Masaya Inoue, Tokyo (JP); Kouichi Ojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/751,936

(22) PCT Filed: Oct. 28, 2015

(86) PCT No.: PCT/JP2015/080354
§ 371 (c)(1),
(2) Date: Feb. 12, 2018

(87) PCT Pub. No.: WO2017/072874
PCT Pub. Date: May 4, 2017

(65) Prior Publication Data
US 2018/0241288 A1    Aug. 23, 2018

(51) Int. Cl.
*H02K 9/19* (2006.01)
*H02K 9/193* (2006.01)
(Continued)

(52) U.S. Cl.
CPC .............. *H02K 9/193* (2013.01); *B60K 1/02* (2013.01); *B60K 11/02* (2013.01); *B60L 1/003* (2013.01);
(Continued)

(58) Field of Classification Search
CPC .... B60K 1/02; B60K 11/02; B60K 2001/006; B60L 1/003; H02K 1/32; H02K 3/24;
(Continued)

(56) References Cited

U.S. PATENT DOCUMENTS 5,372,213 A    12/1994 Hasebe et al.
6,570,276 B1 *   5/2003 Morel ................... F04D 25/082
                                                           310/52
(Continued)

FOREIGN PATENT DOCUMENTS

JP    60-022444 A    2/1985
JP    06-098417 A    4/1994
(Continued)

OTHER PUBLICATIONS

International Search Report of PCT/JP2015/080354 dated Jan. 12, 2016 [PCT/ISA/210].
(Continued)

*Primary Examiner* — Tulsidas C Patel
*Assistant Examiner* — Rashad H Johnson
(74) *Attorney, Agent, or Firm* — Sughrue Mion, PLLC; Richard C. Turner

(57) ABSTRACT

A rotating electrical machine cooling structure such that a cooling medium is supplied by a pump to a stator and rotor of a rotating electrical machine, thereby cooling the stator and rotor, includes a first passage that supplies the cooling medium from the pump to the stator, a second passage that supplies the cooling medium from the pump to the rotor, and a valve that regulates a flow of the cooling medium of the first passage and a flow of the cooling medium of the second passage, wherein a cooling state of the stator and a cooling state of the rotor are controlled by the valve.

10 Claims, 6 Drawing Sheets

(51) Int. Cl.
*B60K 1/02* (2006.01)
*B60K 11/02* (2006.01)
*B60L 1/00* (2006.01)
*H02K 5/132* (2006.01)
*H02K 9/197* (2006.01)
*B60K 1/00* (2006.01)

(52) U.S. Cl.
CPC ............... *H02K 5/132* (2013.01); *H02K 9/19* (2013.01); *H02K 9/197* (2013.01); *B60K 2001/006* (2013.01); *Y02T 10/641* (2013.01)

(58) Field of Classification Search
CPC ............ H02K 5/132; H02K 9/04; H02K 9/08; H02K 9/19; H02K 9/193; H02K 9/197; Y02T 10/641
USPC ................ 310/52, 54, 55, 58, 62, 63, 64, 89
See application file for complete search history.

(56) References Cited

U.S. PATENT DOCUMENTS

| | | | |
|---|---|---|---|
| 6,700,235 B1* | 3/2004 | McAfee | H02K 9/06 310/52 |
| 2013/0334912 A1* | 12/2013 | Tokunaga | H02K 9/19 310/54 |
| 2016/0099633 A1* | 4/2016 | Yoshinori | H02K 9/19 310/53 |
| 2016/0178548 A1* | 6/2016 | Berry | G01K 13/02 165/287 |
| 2016/0322874 A1* | 11/2016 | Yoshinori | H02K 1/32 |
| 2017/0268806 A1* | 9/2017 | Knopp | H02K 1/20 |

FOREIGN PATENT DOCUMENTS

| | | |
|---|---|---|
| JP | 5196268 B2 | 5/2013 |
| JP | 2014-110705 A | 6/2014 |
| JP | 2014-183602 A | 9/2014 |

OTHER PUBLICATIONS

Communication dated Feb. 3, 2020, issued by the State Intellectual Property Office of the P.R.C. in application No. 201580083969.2.
Communication dated Mar. 25, 2020 from German Patent and Trademark Office in DE Application No. 11 2015 007 075.3.
Communication dated May 8, 2019, from The State Intellectual Property Office of the P.R. of China in counterpart Application No. 201580083969.2.

* cited by examiner

FIG. 4A ROTOR ROTATION SPEED
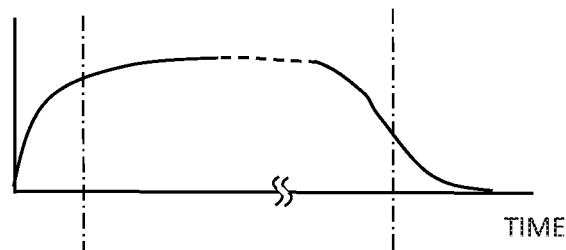
FIG. 4B VALVE OPENING RATIO
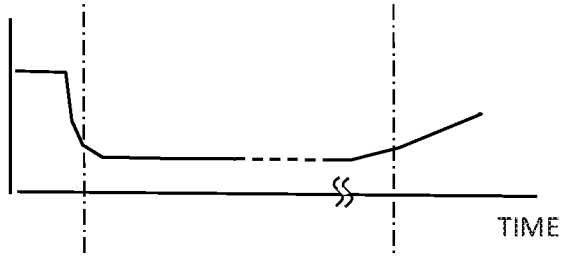
FIG. 4C PUMP OUTPUT
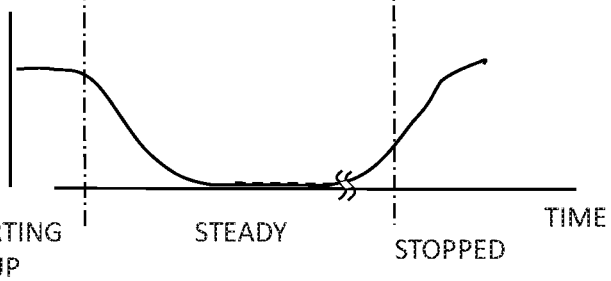
STARTING UP | STEADY | STOPPED

ROTATING ELECTRICAL MACHINE COOLING STRUCTURE, AND CONTROL METHOD THEREOF

CROSS REFERENCE TO RELATED APPLICATIONS

This application is a National Stage of International Application No. PCT/JP2015/080354, filed Oct. 28, 2015, the contents of which are incorporated herein by reference in its entirety.

TECHNICAL FIELD

The present invention relates to a rotating electrical machine cooling structure and to a control method thereof, and in particular, relates to a cooling structure that cools a rotating electrical machine mounted in a vehicle using a coolant, and to a control method thereof.

BACKGROUND ART

A rotating electrical machine mounted in a vehicle such as an automobile has a rotor, and a stator provided on a periphery of the rotor. The rotating electrical machine is used as a motor or generator, and is used so that a rotational force is generated in the rotor by a current being caused to flow into the stator in a case of a motor, and so that current flowing into the stator owing to a rotation of the rotor is extracted in a case of a generator. Further, when a large output is generated in the rotating electrical machine, heat generated by the rotor and stator of the rotating electrical machine increases. When temperatures of the rotor and stator rise, a problem such as a decrease in magnetic force of the rotor or an insulation failure in the stator occurs.

Because of this, a cooling structure is employed in the rotating electrical machine. A structure such that a cooling medium passing from a pump through an interior of the rotor is jetted onto the stator, cooling the rotor and stator, is known as a rotating electrical machine cooling structure (Patent Document 1). Also, a configuration such that cooling of both of two rotating electrical machines, those being a generator of a hybrid vehicle-use drive device and an electric motor, is carried out using one pump has been proposed (Patent Document 2).

In the case of the cooling structure wherein the cooling medium that passes through the interior of the rotor is jetted onto the stator, a configuration is such that, in order to simplify the structure as far as possible, the cooling medium is jetted onto the stator utilizing centrifugal force generated by the rotation of the rotor.

Also, in the case of the hybrid vehicle-use drive device, optimization of a path of a cooling medium for carrying out cooling of not only the generator but also the electric motor, and of a position in which the cooling medium is stored, has been proposed.

CITATION LIST

Patent Literature

Patent Document 1: JP-A-2014-183602
Patent Document 2: Japanese Patent No. 5,196,268

SUMMARY OF INVENTION

Technical Problem

The cooling structure wherein the cooling medium is jetted onto the stator utilizing centrifugal force generated by the rotation of the rotor is such that the jetting of the cooling medium depends on the rotation speed of the rotor, because of which the amount of cooling medium supplied to the stator decreases when the rotor rotates at low speed, and there is a problem in that cooling of the stator is not carried out sufficiently. In response to this problem, providing a multiple of pumps that supply a necessary flow of the cooling medium to each portion, or increasing the total amount of liquid, is generally considered. When a condition of reducing the size and weight of the overall device is set, however, providing a multiple of pumps is not necessarily an appropriate solution.

Also, when cooling the rotors and stators of a multiple of rotating electrical machines too, there is a problem in that the necessary flow of the cooling medium cannot be supplied to each rotating electrical machine only by sharing a pump and simply connecting cooling medium passages, due to a difference in passage resistances of the cooling medium flowing to the rotating electrical machines, a difference in suction effects in accordance with the rotor rotation speeds of the rotating electrical machines, and the like.

The invention, having been contrived focusing on the previously described problems, has an object of providing a rotating electrical machine such that stator and rotor cooling performance can be improved in accordance with an operating state of the rotating electrical machine.

Solution to Problem

In order to achieve the heretofore described object, the invention is a rotating electrical machine cooling structure such that a cooling medium is supplied by a pump to a stator and rotor of a rotating electrical machine, thereby cooling the stator and rotor, the rotating electrical machine cooling structure includes a first passage that supplies the cooling medium from the pump to the stator, a second passage that supplies the cooling medium from the pump to the rotor, and a valve that regulates a flow of the cooling medium of the first passage and a flow of the cooling medium of the second passage, and a cooling state of the stator and a cooling state of the rotor are controlled by operating the valve. Also, in order to improve cooling performance, the valve is controlled when the pump is started up, thereby controlling the flow of the cooling medium supplied to the stator and rotor.

Advantageous Effects of Invention

The invention is such that a cooling medium used in cooling a rotating electrical machine can be supplied, efficiently distributed, to a stator and rotor in accordance with a state of the stator and rotor, without depending on the rotation speed of the rotating electrical machine, because of which the cooling performance of the rotating electrical machine can be improved. Also, the magnetic force of the rotor is not reduced owing to the rotor cooling efficiency being increased, because of which the use of high-cost rare earth elements generally used in order to raise the magnetic force of a magnet can be reduced, leading to a reduction in cost. Also, heat resistance of a coil and insulating material can be lowered by raising the stator cooling efficiency. Also, as the cooling medium can flow smoothly, the cooling performance improves.

BRIEF DESCRIPTION OF DRAWINGS

FIGS. 4A to 4C are diagrams showing operating states of a rotating electrical machine of the first embodiment of the invention.

DESCRIPTION OF EMBODIMENTS

First Embodiment

Figure 1:
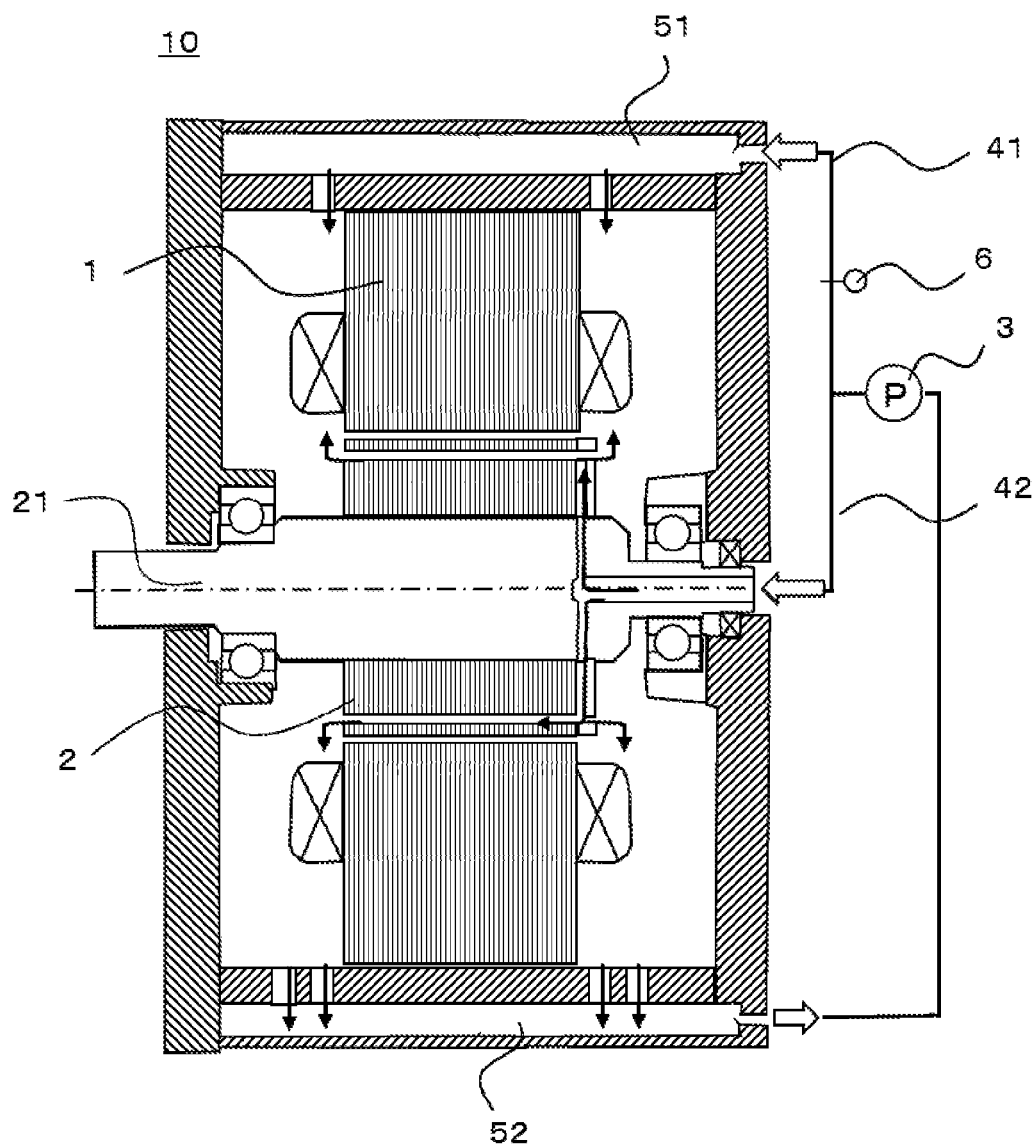
FIG. 1 is a schematic configuration diagram showing a rotating electrical machine cooling structure of a first embodiment of the invention.

FIG. 1 is a schematic configuration diagram showing a rotating electrical machine cooling structure of the invention. As shown in FIG. 1, a rotating electrical machine 10 includes a stator 1 and a rotor 2, and a pump 3 is externally attached in order to supply a cooling medium to the stator 1 and rotor 2. A first passage 41 is provided between the pump 3 and stator 1, and the cooling medium is supplied from the pump 3 to the stator 1. Also, a second passage 42 is provided between the pump 3 and rotor 2, and the cooling medium is supplied from the pump 3 to the rotor 2. Actually, the cooling medium is not supplied directly to the stator 1, but is supplied from the pump 3 through the first passage 41 to an upper reservoir 51 of the cooling medium provided in an upper portion of the rotating electrical machine 10, and the cooling medium drops, or is jetted, from the upper reservoir 51 toward the stator 1.

Cooling medium passages are provided in an axial direction and radial direction in a rotational shaft 21 and the rotor 2. The cooling medium supplied from the second passage 42 to the rotor 2 is injected into a cooling medium passage provided in the center of the rotational shaft 21 of the rotor 2, passes through a radial direction cooling medium passage owing to centrifugal force generated by rotation of the rotational shaft 21, and is discharged to an outer periphery of the rotor 2. Herein, a configuration is such that when the rotation of the rotor 2 increases, a self-pumping effect whereby the cooling medium is taken in and expelled is generated by centrifugal force accompanying the rotation.

The cooling medium poured onto the stator 1 and rotor 2 takes heat from each thereof, drops, and accumulates in a lower reservoir 52 provided in a lower portion of the rotating electrical machine 10. The cooling medium in the lower reservoir 52 is suctioned by the pump 3, and supplied again to the stator 1 and rotor 2 through the first passage 41 and second passage 42.

In order to generate the previously described self-pumping effect, it is necessary that not only the structure of the rotor 2, but also the passages through which the cooling medium circulates from the lower reservoir 52 to the rotational shaft 21 of the rotor 2, are filled with the cooling medium. That is, a suction force acts when centrifugal force generated by the rotation of the rotor 2 takes effect and the cooling medium is expelled, but the cooling medium is not suctioned unless the passages are in a state of being filled with the cooling medium.

A valve 6 is provided in the first passage 41 provided between the pump 3 and stator 1, whereby a flow of the cooling medium supplied from the first passage 41 to the stator 1 is controlled. Herein, as there are two passages, those being the first passage and second passage, with respect to a discharge from the pump 3, the flow of the cooling medium flowing through the second passage 42 increases when the valve 6 is tightened in order to reduce the flow in the first passage 41.

Herein, a valve that can be electrically controlled being desirable as the valve 6, an electromagnetic valve or electric valve, for example, is appropriate. An electromagnetic valve is appropriate in order to carry out an operation of opening and closing a passage at high speed, while an electric valve is appropriate in order to finely control flow regulation in multiple stages.

Figure 2:
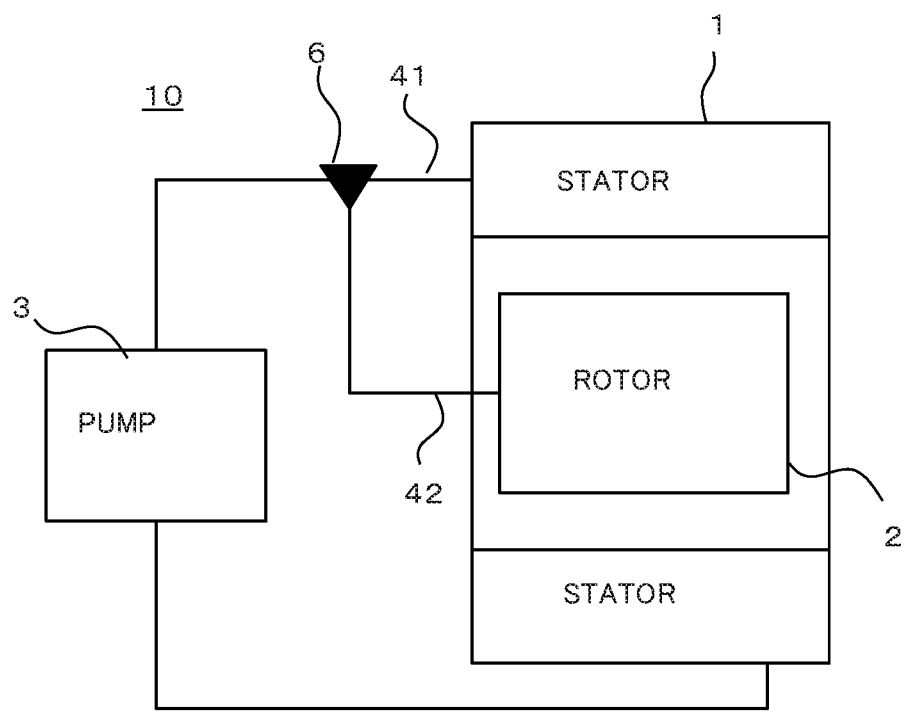
FIG. 2 is a configuration diagram of the rotating electrical machine cooling structure of the first embodiment of the invention.

The structure shown in FIG. 1 represented in abbreviated form is as shown in FIG. 2. That is, the passages from the pump 3 forcibly cause the cooling medium to flow to the stator 1 and rotor 2, and the cooling medium, after cooling the stator 1 and rotor 2, is collected in the pump 3 from a lower portion of the stator 1.

Figure 3:
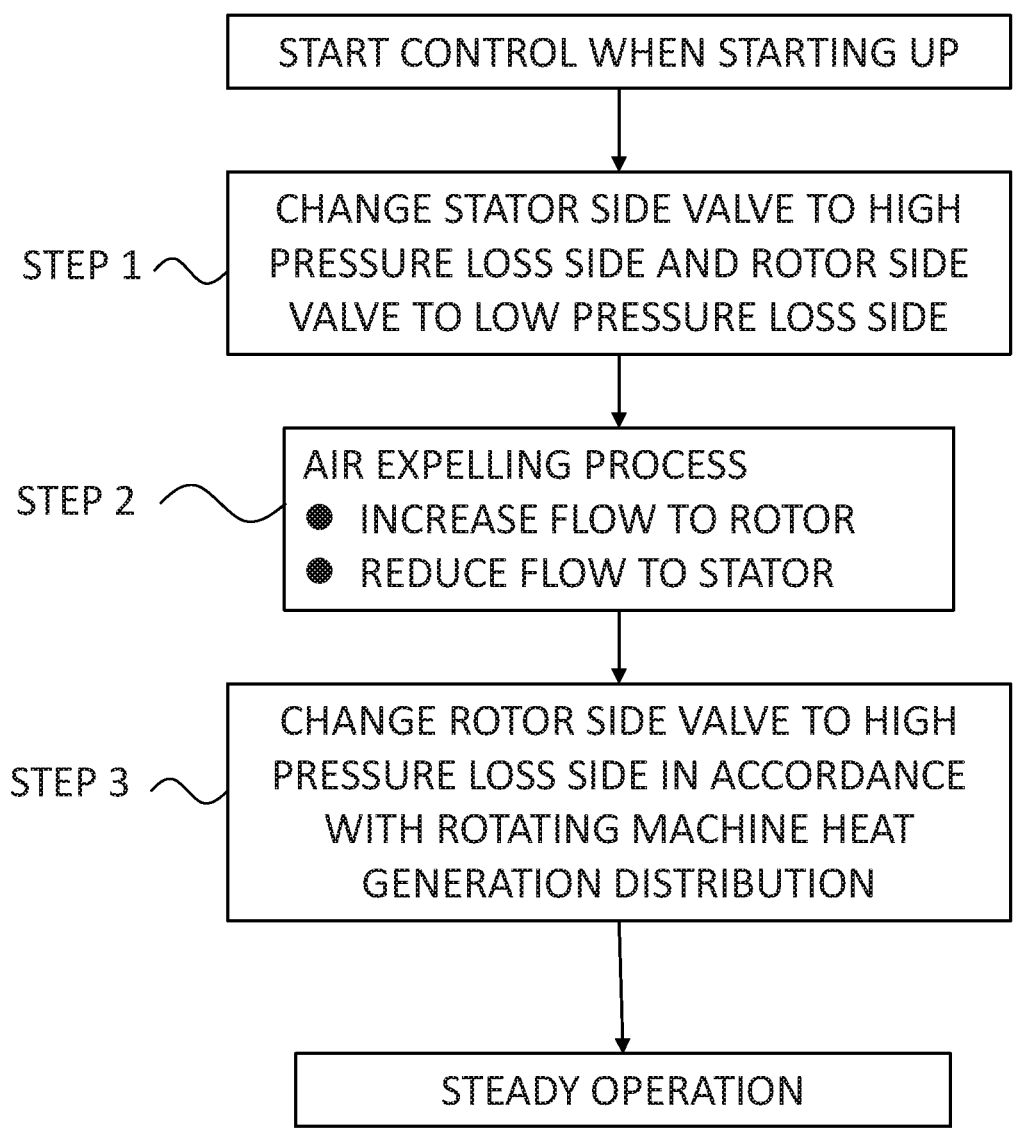
FIG. 3 is a flow diagram showing an operation when starting up the rotating electrical machine cooling structure of the first embodiment of the invention.

A rotating electrical machine including this cooling structure, when started-up, enters steady operation via a procedure shown in FIG. 3. In a flow diagram shown in FIG. 3, an explanation is given with a case of a configuration such that the valve 6 is provided on both sides, those being the first passage 41 and second passage 42 of the cooling medium, in FIG. 1 as an example. Herein, the same advantage can be obtained when the valve 6 is provided only in the first passage 41, as shown in FIG. 1, when the valve 6 is provided in both the first passage 41 and second passage 42, and furthermore, when a three-way valve is provided in a junction of the first passage 41 and second passage 42, that is, whichever configuration is employed in order to control the flow of the cooling medium flowing through each passage.

When control when starting up is started, the valve 6 on the stator 1 side is set to a high pressure loss side, and a valve on the rotor 2 side is set to a low pressure loss side, as step 1, as shown in the flow diagram of FIG. 3. When carrying out an operation of the valve 6 in this way, the flow of the cooling medium to the rotor 2 is increased, and the flow of the cooling medium supplied to the stator 1 side is limited, as step 2. Owing to this operation, air in the passages is expelled. When this operation is not carried out, air enters a portion of the pump 3 to which pressure is applied, the air is compressed, an idling of the pump 3 occurs, and a problem occurs in that the cooling medium can no longer be supplied, or a problem occurs in that cooling becomes insufficient due to an abnormal noise occurring, or to a discharge capacity of the rotor 2 decreasing.

When the control when starting up is completed, control of the valve 6 is carried out in accordance with temperature distribution in the rotating electrical machine 10 as step 3, and the procedure shifts to steady operation.

The flow diagram shown in FIG. 3 is shown in FIGS. 4A to 4C as relationships between operation of the rotor 2, operation of the valve 6, and output of the pump 3. Firstly, in a start-up state, the rotation speed of the rotor 2 rises as shown in FIG. 4A, the valve 6 is operated simultaneously with a start of the output of the pump 3, as described in FIG. 3, and the flow of the cooling medium to the rotor 2 is increased, as shown in FIG. 4B. Subsequently, when the steady state is reached, the rotation speed of the rotor 2 reaches a predetermined value, and the cooling system can be operated without the power of the pump 3, using the self-pumping effect generated by centrifugal force. Because of this, the operation of the pump 3 is in a state of not applying power to the cooling medium, as shown in FIG. 4C. Furthermore, when the rotation of the rotor 2 is stopped, the output of the pump 3 is increased again in accordance with a decrease in the rotation of the rotor 2, whereby the temperature of the rotating electrical machine 10 is reduced.

Figure 5:
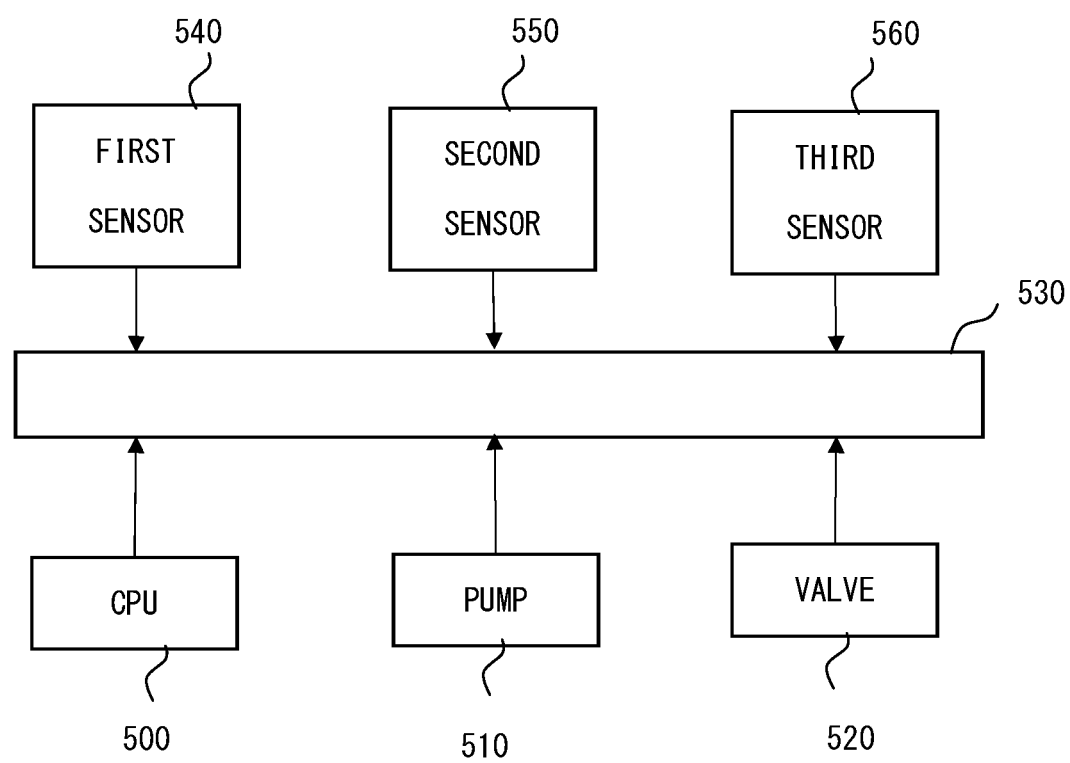
FIG. 5 is a diagram showing a control system of the rotating electrical machine cooling structure of the first embodiment of the invention.

The previously described operation is carried out by computer control, and the control system has a configuration shown in FIG. 5.

In FIG. 5, information 510 of the pump 3 and information 520 of the valve 6 are sent to a central processing unit (CPU) 500 via a data bus 530, and operations of the pump 3 and valve 6 are controlled in the CPU 500 based on information from various kinds of sensor (a first sensor 540, a second sensor 550, and a third sensor 560) provided in various places in the rotating electrical machine 10. The sensors can be assumed to be sensors that obtain, for example, temperature information of the stator 1, temperature information of the rotor 2, temperature information of the upper reservoir 51, temperature information of the lower reservoir 52, external air temperature information, information on the rotation speed of the rotor 2, and the like. Also, the rotating electrical machine cooling structure is such that the distribution of the flow of the cooling medium in the first passage and the flow of the cooling medium in the second passage is determined based on a relationship between the rotation speed of the rotating electrical machine and output torque.

Second Embodiment

Figure 6:
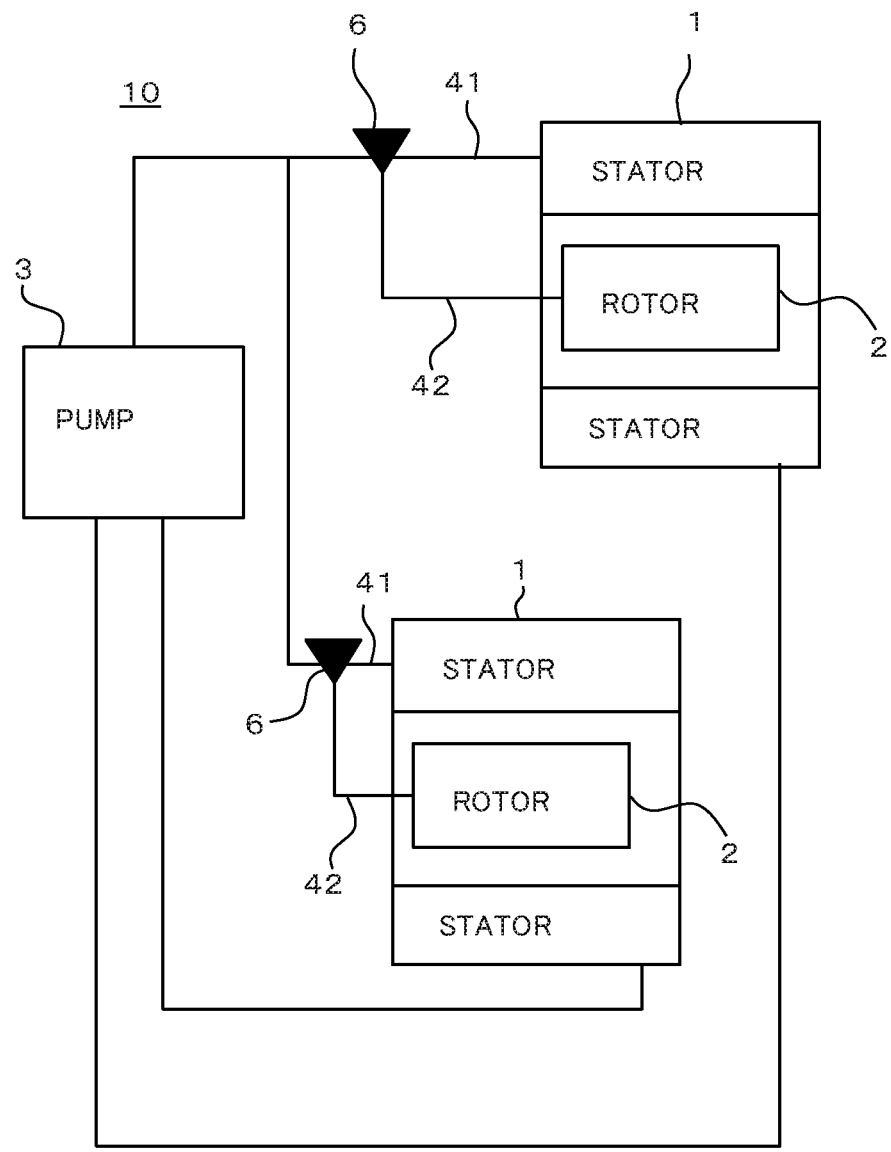
FIG. 6 is a configuration diagram of a rotating electrical machine cooling structure of a second embodiment of the invention.

FIG. 6 shows a configuration of a second embodiment of the invention. The configuration shown in FIG. 6 is a modified example of the first embodiment of the invention shown in FIG. 2. The second embodiment shows a configuration wherein the cooling medium is supplied from one pump 3 to main bodies of two rotating electrical machines 10.

Herein, this is a case of a cooling structure when a rotating electrical machine is such that two rotating electrical machines are used in combination and, for example, an engine and drive-use rotating electrical machine and a power generating rotating electrical machine in a hybrid vehicle-use drive device are included as the rotating electrical machines, and the cooling structure has the valve 6, which can control the flow distribution state of the cooling medium supplied to each stator 1 and rotor 2. Further, the amount of heat generated by the drive-use rotating electrical machine increases in a region in which the engine rotation speed is low, and the amount of heat generated by the power generating rotating electrical machine increases in a region in which the engine rotation speed is high. Consequently, cooling performance can be raised in accordance with the engine rotation speed or in accordance with the amount of heat generated by the rotating electrical machine.

According to this configuration, cost can be reduced and space can be conserved in comparison with when providing a multiple of pumps and controlling individually. In the second embodiment, only the relationship between the cooling medium passages and valves is described, but the control when starting up the rotating electrical machine shown in FIG. 3, and the control system configuration shown in FIG. 5, can be employed in the same way as in the first embodiment.

Also, when pumps are provided individually when there are a multiple of rotating electrical machine main bodies, a difference occurs in rotor pumping effects due to a difference in the rotor rotation speeds of the individual rotating electrical machines, a large amount of the cooling medium is taken by a rotating electrical machine with a high rotation speed, and a problem occurs in that appropriate flow distribution cannot be carried out. Because of this, the cooling medium passages are opened to the atmosphere in order to correct the difference in pumping effects.

According to the configuration of the second embodiment of the invention, however, the cooling medium is supplied to a multiple of rotating electrical machines using one pump, and valves that control the amount of cooling medium supplied to the stators and rotors are provided in the passages, whereby control of the whole of the cooling structure can be carried out, and pump pressure can be utilized as it is in supplying the cooling medium, without opening to the atmosphere, even when a difference in pumping effects occurs.

The embodiments of the invention can be modified or abbreviated as appropriate, without departing from the scope of the invention. Also, the device used in the description in the embodiments, not being limited to a single unit, can be implemented as means of achieving the same function by devices with a multiple of functions being combined.

The invention claimed is:

1. A rotating electrical machine cooling structure such that a cooling medium is supplied by a pump to a stator and rotor of a rotating electrical machine, thereby cooling the stator and rotor, the rotating electrical machine cooling structure comprising:
   a first passage that supplies the cooling medium from the pump to the stator;
   a second passage that supplies the cooling medium from the pump to the rotor; and
   a valve that regulates a flow of the cooling medium of the first passage and a flow of the cooling medium of the second passage;
   a rotation speed sensor configured to sense a rotation speed of the rotor; and
   a controller configured to operate the valve to control a cooling state of the stator and a cooling state of the rotor,
   wherein the valve is operated so that the flow of the cooling medium to the rotor is increased, and the flow of the cooling medium to the stator is limited, when the pump is started up, and
   wherein the controller is configured to receive the rotation speed of the rotor from the rotation speed sensor and operate the valve based on the rotation speed of the rotor.

2. The rotating electrical machine cooling structure according to claim 1, comprising a radial direction passage in a rotational shaft of the rotor, and having a self-pumping effect such that the cooling medium is taken in from the passage and expelled owing to centrifugal force generated by a rotation of the rotor.

3. The rotating electrical machine cooling structure according to claim 1, wherein a plurality of the stators and rotors are provided, the first passage is provided in the plurality of the stators, and the second passage is provided in the plurality of the rotors.

4. The rotating electrical machine cooling structure according to claim 1, wherein the valve is such that control of flow distribution is carried out based on a relationship between the rotation speed of the rotor and output torque.

5. The rotating electrical machine cooling structure according to claim 1, wherein the valve is such that control of flow distribution is carried out based on temperature information of the stator or temperature information of the rotor.

6. The rotating electrical machine cooling structure according to claim 1, wherein the valve is an electromagnetic valve.

7. The rotating electrical machine cooling structure according to claim 1, wherein the valve is an electric valve.

8. The rotating electrical machine cooling structure according to claim 1, wherein the pump is operated in a start-up state of the rotating electrical machine, and
wherein operation of the pump is gradually reduced as the rotor reaches a steady state of rotation after the start-up state.

9. The rotating electrical machine cooling structure according to claim 1, wherein the controller is configured to operate the pump based on the rotation speed of the rotor.

10. A control method of a rotating electrical machine cooling structure such that a cooling medium is supplied by a pump to a stator and rotor of a rotating electrical machine, the rotating electrical machine cooling structure comprising:
a first passage that supplies the cooling medium from the pump to the stator;
a second passage that supplies the cooling medium from the pump to the rotor; and
a valve that regulates a flow of the cooling medium of the first passage and a flow of the cooling medium of the second passage, wherein
the valve is operated so that the flow of the cooling medium to the rotor is increased, and the flow of the cooling medium to the stator is limited, when the pump is started up.

* * * * *